United States Patent
Ghergu et al.

(10) Patent No.: US 11,868,812 B2
(45) Date of Patent: Jan. 9, 2024

(54) PREDICTIVE SCALING OF CONTAINER ORCHESTRATION PLATFORMS

(71) Applicant: International Business Machines Corporation, Armonk, NY (US)

(72) Inventors: Laurentiu Gabriel Ghergu, Bucharest (RO); Filis Omer, Constanta (RO); Costel Moraru, Egmating (DE); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 17/400,385

(22) Filed: Aug. 12, 2021

(65) Prior Publication Data

US 2023/0050796 A1    Feb. 16, 2023

(51) Int. Cl.
*G06F 9/50*    (2006.01)
*G06N 3/045*    (2023.01)

(52) U.S. Cl.
CPC ............. *G06F 9/505* (2013.01); *G06N 3/045* (2023.01); *G06F 2209/5019* (2013.01)

(58) Field of Classification Search
None
See application file for complete search history.

(56) References Cited

U.S. PATENT DOCUMENTS 11,330,378 B1 *  5/2022  Jelčicová ............. H04R 25/507
11,550,635 B1 *  1/2023  Wong ....................... G06F 9/455
(Continued)

FOREIGN PATENT DOCUMENTS

CN    108595267 A    9/2018
CN    108874542 A    11/2018
(Continued)

OTHER PUBLICATIONS

Camero, Andres et al. "Random Error Sampling-based Recurrent Neural Network Architecture Optimization". (Year: 2021).*

(Continued)

*Primary Examiner* — Adam Lee
(74) *Attorney, Agent, or Firm* — Randy Tejeda

(57) ABSTRACT

Systems, methods, and computer programming products leveraging recurrent neural network architectures to proactively predict workload demand of container orchestration platforms. The platform continuously collects metric data from clusters of the platform and train multiple parallel neural networks with different architectures to predict future platform workload demands. At periodic intervals, the registered neural networks in consideration for controlling the scaling operations of the platform are compared against one another to identify the neural network demonstrating the highest performance and/or most accurate workload prediction strategy for scaling the orchestration platform. The selected neural network is enforced as controller for the platform to implement the workload prediction strategy. The neural network controller enforced by the platform predictively scales up or down the number of pods within nodes of the platform and/or the number of clusters providing computational resources to the platform, in anticipation of future increased or decreased end user demand.

20 Claims, 6 Drawing Sheets

(56) References Cited

U.S. PATENT DOCUMENTS

| | | | |
|---|---|---|---|
| 2016/0239592 A1* | 8/2016 | Pourmousavi Kani | B60L 58/12 |
| 2018/0241812 A1* | 8/2018 | Marchetti | H04L 67/1023 |
| 2018/0349168 A1 | 12/2018 | Ahmed | |
| 2018/0349202 A1* | 12/2018 | Sharma | G06F 9/5077 |
| 2019/0140913 A1* | 5/2019 | Guim Bernat | G06N 3/105 |
| 2019/0370637 A1* | 12/2019 | Dunning | G06N 3/047 |
| 2020/0000373 A1* | 1/2020 | Agrawal | A61B 5/7267 |
| 2020/0019841 A1* | 1/2020 | Shaabana | G06N 3/08 |
| 2020/0034702 A1* | 1/2020 | Fukuda | G06N 3/08 |
| 2020/0257968 A1 | 8/2020 | Mitra | |
| 2020/0342291 A1* | 10/2020 | Croxford | G06T 7/50 |
| 2020/0379814 A1 | 12/2020 | Blagodurov | |
| 2020/0380351 A1* | 12/2020 | Verma | G06N 3/044 |
| 2021/0004676 A1* | 1/2021 | Jaderberg | G06N 3/08 |
| 2021/0087922 A1* | 3/2021 | Salunke | E21B 47/06 |
| 2023/0084130 A1* | 3/2023 | Akhssay | G03F 7/70258 |

FOREIGN PATENT DOCUMENTS

| | | |
|---|---|---|
| CN | 107045455 B | 6/2019 |
| CN | 110764875 A | 2/2020 |
| CN | 111124689 A | 5/2020 |
| CN | 111198754 A | 5/2020 |
| CN | 111491006 A | 8/2020 |
| CN | 111694656 A | 9/2020 |
| CN | 111984381 A | 11/2020 |
| CN | 112187894 A | 1/2021 |
| CN | 110231976 B | 4/2021 |
| EP | 3745264 A1 | 12/2020 |

OTHER PUBLICATIONS

Baig et al., "Adaptive Prediction Models for Data Center Resources Utilization Estimation", IEEE Transactions on Network and Service Management, Jul. 2019, DOI: 10.1109/TNSM.2019.2932840, 15 pages.

Chung et al., "Empirical Evaluation of Gated Recurrent Neural Networks on Sequence Modeling", arXiv:1412.3555v1 [cs.NE], Dec. 11, 2014, 9 pages.

Jozefowicz et al., "An Empirical Exploration of Recurrent Network Architectures", Proceedings of the 32nd International Conference on Machine Learning, Lille, France, 2015, JMLR: W&CP vol. 37, 9 pages.

Mell et al., "The NIST Definition of Cloud Computing", Recommendations of the National Institute of Standards and Technology, Special Publication 800-145, Sep. 2011, 7 pages.

Tang et al., "Fisher: An Efficient Container Load Prediction Model with Deep Neural Network in Clouds", 2018 IEEE Intl Conf on Parallel & Distributed Processing with Applications, Ubiquitous Computing & Communications, Big Data & Cloud Computing, Social Computing & Networking, Sustainable Computing & Communications, 2018, pp. 199-206.

Xie et al., "Real-time Prediction of Docker Container Resource Load Based on a Hybrid Model of ARIMA and Triple Exponential Smoothing", IEEE Transactions on Cloud Computing, Feb. 2020, 17 pages.

Yin et al., "Comparative Study of CNN and RNN for Natural Language Processing", arXiv: 1702.01923v1 [cs.CL], Feb. 7, 2017, 7 pages.

\* cited by examiner

PREDICTIVE SCALING OF CONTAINER ORCHESTRATION PLATFORMS

TECHNICAL FIELD

The present disclosure relates generally to the field of container orchestration and neural networks, and more particularly to predicting resource requirements of a container orchestration platform using competing recursive neural networks to periodically select a neural network controller with the neural network architecture providing the most accurate future predictions for scaling up or down clusters and/or nodes of the platform.

BACKGROUND

Container orchestration automates the deployment, management, scaling and networking of containers. Enterprises that need to deploy and manage hundreds, or thousands of containers and hosts can benefit from container orchestration. Container orchestration can be used in any environment where you use containers. Orchestration tools can deploy the same application across different environments without needing to redesign it, while microservices provided by containers make it easier to orchestrate services, including storage, networking, and security. Containers provide microservice-based apps with an application deployment unit and self-contained execution environment, making it possible to run multiple parts of an application independently via microservices on the same hardware, offering much greater control over individual pieces and life cycles. Container orchestration can automate and manage tasks such as provisioning and deployment, configuration and scheduling, resource allocation, container availability, scaling or removing containers to balance workloads across infrastructure, traffic routing, monitoring container health, and maintaining security between containers.

Container orchestration tools can configure an application using either a YAML or JSON file. The configuration file instructs the configuration management where to find container images, how to establish a network, and where to store logs. Deploying new containers can be automated by scheduling deployments to a cluster and finding the right host, taking into account any defined requirements or restrictions. The orchestration tools can manage the container's life cycle based on the specifications contained in the configuration file and scale container-based applications and services. Container orchestration can be used in any environment capable of running containers, including on-premises servers, public cloud or private cloud environments.

A recurrent neural network (RNN) is a type of artificial neural network that can recognize the sequential characteristics of data and the use patterns of the data to predict the next likely scenario. RNNs are used in deep learning and in the development of models that simulate neuron activity in the human brain. RNN's may be especially powerful in use cases where context is critical to predict an outcome. Moreover, RNNs are also distinct from other types of artificial neural networks because they use feedback loops to process a sequence of data that informs the final output. These feedback loops allow information to persist. This effect often is described as memory. Artificial neural networks are created with interconnected data processing components that are loosely designed to function like the human brain. They are composed of layers of artificial neurons, network nodes, that have the ability to process input and forward output to other nodes in the network. The nodes are connected by edges or weights that influence a signal's strength and the network's final output.

SUMMARY

Embodiments of the present disclosure relate to a computer-implemented method, an associated computer system and computer program products for periodically selecting a neural network controller from a plurality of competing neural networks having different network architectures. The computer-implemented method comprises the steps of continuously training in parallel, by a management node of the container orchestration platform, a plurality of recurrent neural networks registered with container orchestration platform using metric data collected by one or more computational nodes; periodically selecting, by the management node, a recurrent neural network from the plurality of recurrent neural networks registered with the container orchestration platform, as a winner based on the performance of the neural network during the continuous training to predict a most accurate workload estimation strategy as measured by the mean absolute error of the recurrent neural network; loading, by the management node, the neural network controller of the recurrent neural network enforced as the neural network controller for the container orchestration platform; and predictively scaling, by the neural network controller loaded into the management node, resources of the container orchestration platform in accordance with the workload estimation strategy predicted by the recurrent neural network.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1:
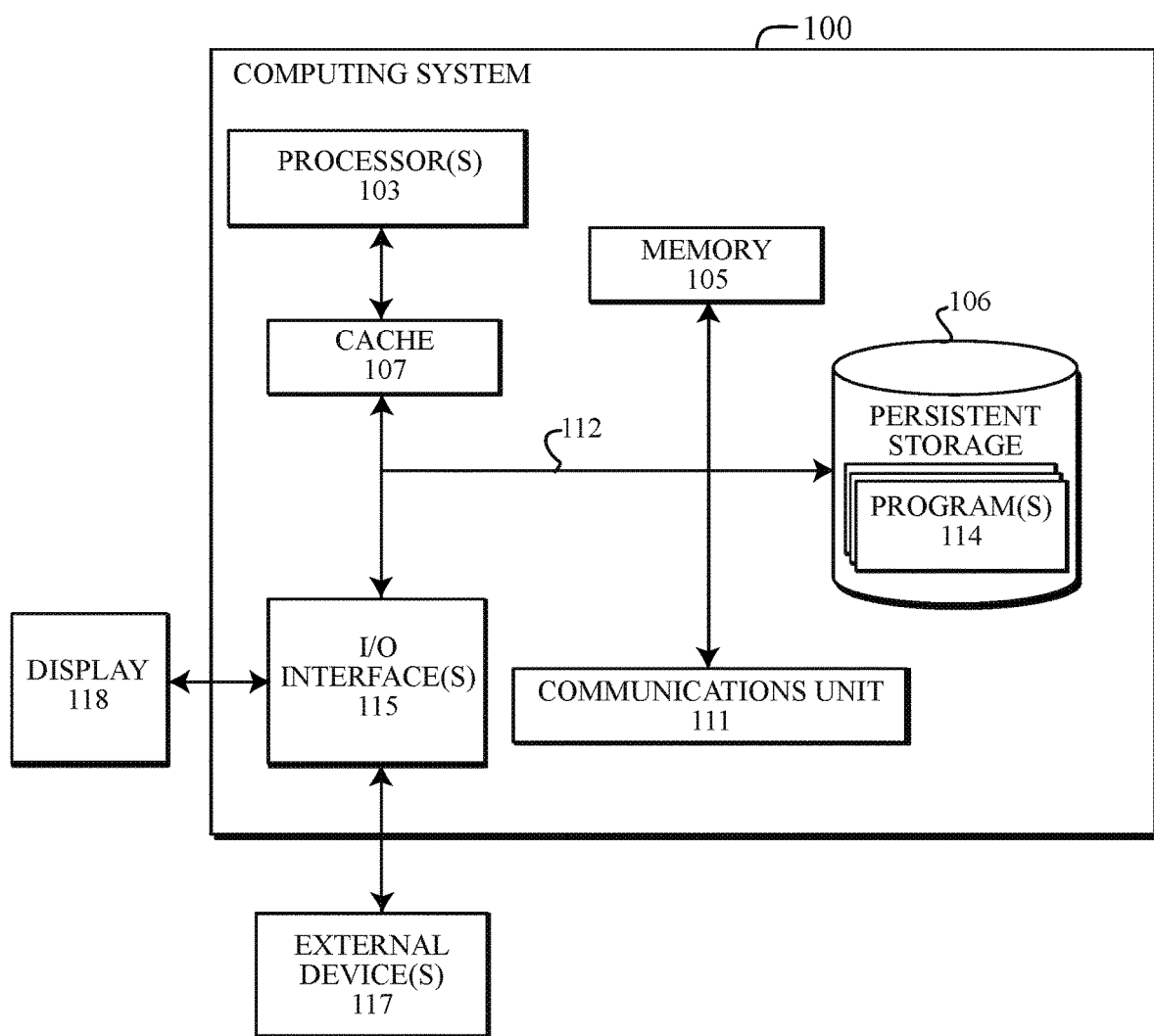
FIG. 1 depicts a block diagram illustrating internal and external components of an embodiment of a computing system in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

Container orchestration platforms allow application developers to design scalable systems, where additional containers can be added or removed from clusters based on the overall workloads being serviced by the platform. Distributed container orchestration platforms can comprise managing controllers that attempt to match a desired state via a declarative or imperative declaration that occurs by reacting to the changing requirements of the platform. As workloads increase or decrease, the orchestration platform can respond by scaling clusters up or down with more containers or pods to adjust for needs of more or less computing resources. These managing controllers can use various metrics to estimate when scaling up or down one or more clusters may be appropriate. Examples of these metrics can include CPU utilization, memory consumption, the number of users accessing a specific URL of a workload, etc.

The embodiments of the present disclosure recognize that existing orchestration platforms offer very limited strategy options for selecting an appropriate scalability of containers by an orchestration platform. Existing strategies do not take a proactive approach to estimate peak demand or resource requirements well in advanced of experiencing the peak operating workloads. Rather, existing container orchestration strategies are reactive in nature, whereby scaling the containers of the clusters occurs as problems appear. As a result of implementing strategies that are reactive instead of proactive, the adaptability of existing systems is reduced, and costs are increased overall. In cases where initialization of computational executions takes longer or the workload demand is rapidly increasing, the reactive approach is unable to distribute the excess workloads until scaling activities are completed and available to use. This means that not all service requests are able to be immediately fulfilled. Moreover, the reactive approach to making estimations of future resource demand by using currently collected metrics from the clusters are prone to errors. The estimations using collected metrics to react to resource needs are based on end user behavior that cannot be used in a pre-trained model that would allow the platform to improve the performance of predicting future resource demand.

Embodiments of the present disclosure may leverage the use of various neural network architectures to proactively predict workload demand on the container orchestration platform and scale up or down the resources of the clusters and containers or pods within the clusters of the platform before demand for the resources occur. Embodiments of the present disclosure trains, in parallel, a family of neural networks comprising different types of neural networks that may have different architectures. Based on the training results, the container orchestration platform can dynamically select the neural network comprising the architecture that best predicts cluster behavior and learning performance. Embodiments of the container orchestration platform can periodically select and switch between neural networks having different architectures in order to proactively improve the resource consumption predictions. Based on the predictions of the selected neural network managing the controller of the container orchestration platform, clusters of the platform are able to take proactive actions that scale the workload by increasing the number of containers or pods being orchestrated and/or by adding more computing resources to the clusters; for example, by increasing the number of nodes in a cluster.

Embodiments of the container orchestration platform may periodically assess which neural network controller offers the best predictions and switch between neural network controllers at a selected time interval. For example, once per day, once per week, every month, etc. As neural networks are continuously trained using the data from the clusters of the container orchestration platform, performance of each neural network available to the container orchestration platform can be continuously tracked. Periodically, during the selected time interval, embodiments of the container orchestration platform can assess predictive capabilities the registered neural networks and each of the competing neural networks may have an opportunity to control the scaling of the platform. For example, by comparing the mean absolute error (MAE) of the neural networks' predictions. Once a winner amongst the available neural networks is selected, the winning neural network is enforced as the neural network controller and becomes responsible for scaling-up and down resources of the platform by either increasing the number of containers or pods within a cluster and/or by adding or removing additional computational nodes (referred to herein as "compute nodes") if the total workload is becoming close to consuming the total available resources of one or more clusters.

Computing System

Figure 2:
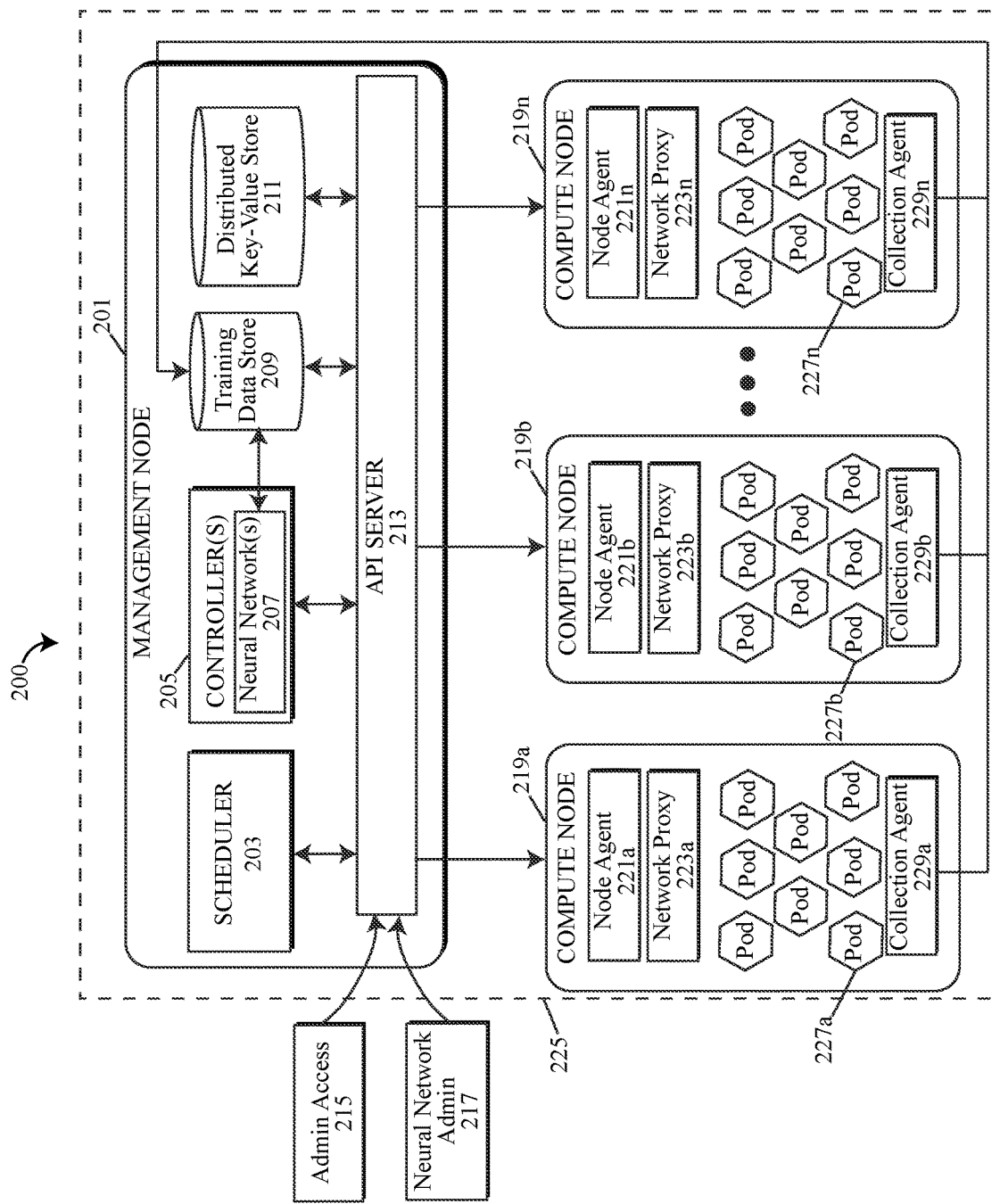
FIG. 2 depicts a functional block diagram describing an embodiment of a computing environment for implementing container orchestration in accordance with the present disclosure.

FIG. 1 illustrates a block diagram of an embodiment of a computing system 100, which may be a simplified example of a computing device (i.e., a physical bare metal system or virtual system) capable of performing the computing operations described herein of a container orchestration platform 200, and for periodically selecting a neural network controller of the container orchestration platform 200 from a plurality of competing neural networks 207 having at least two different network architectures. Computing system 100 may be representative of the one or more computing systems, devices or nodes 201, 219a-n, 310 implemented as part of the container orchestration platform 200 as shown in FIGS. 2 and/or a cloud computing environment 300, in accordance with the embodiments of the present disclosure and further described below in detail. It should be appreciated that FIG. 1 provides only an illustration of one implementation of a computing system 100 and does not imply any limitations regarding the environments in which different embodiments may be implemented. In general, the components illustrated in FIG. 1 may be representative of any electronic device, either physical or virtualized, capable of executing machine-readable program instructions.

Although FIG. 1 shows one example of a computing system 100, a computing system 100 may take many different forms, including bare metal computer systems, virtualized computer systems, container-oriented architecture, and microservice-oriented architecture. For example, computing system 100 can take the form of real or virtualized systems, including but not limited to desktop computer systems, laptops, notebooks, tablets, servers, client devices, network devices, network terminals, thin clients, thick clients, kiosks, mobile communication devices (e.g., smartphones), multiprocessor systems, microprocessor-based systems, minicomputer systems, mainframe computer systems, smart devices, and/or Internet of Things (IoT) devices. The computing systems 100 can operate in a local computing environment, networked computing environment, a containerized computing environment comprising one or more distributed pods or containers, and/or a distributed cloud computing environment, which can include any of the systems or devices described herein and/or additional computing devices or systems known or used by a person of ordinary skill in the art.

Computing system 100 may include communications fabric 112, which can provide for electronic communications among one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, CPUs, and network processors, etc.), memory 105, external devices 117, and any other hardware components within a computing system 100. For example, communications fabric 112 can be implemented as one or more buses, such as an address bus or data bus.

Memory 105 and persistent storage 106 may be computer-readable storage media. Embodiments of memory 105 may include random access memory (RAM) and/or cache 107 memory. In general, memory 105 can include any suitable volatile or non-volatile computer-readable storage media and may comprise firmware or other software programmed into the memory 105. Program(s) 114, software applications, processes, services, and installed components thereof, described herein, may be stored in memory 105 and/or persistent storage 106 for execution and/or access by one or more of the respective processor(s) 103 of the computing system 100.

Persistent storage 106 may include a plurality of magnetic hard disk drives, solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between computing systems 100. For example, between one or more computer systems or devices via a communication network 250. In the exemplary embodiment, communications unit 111 may include network adapters or interfaces such as a TCP/IP adapter cards, wireless interface cards, or other wired or wireless communication links. Communication networks can comprise, for example, copper wires, optical fibers, wireless transmission, routers, load balancers, firewalls, switches, gateway computers, edge servers, and/or other network hardware which may be part of, or connect to, nodes of the communication networks including devices, host systems, terminals or other network computer systems. Software and data used to practice embodiments of the present disclosure can be downloaded to the computing systems 100 operating in a network environment through communications unit 111 (e.g., via the Internet, a local area network, or other wide area networks). From communications unit 111, the software and the data of program(s) 114 can be loaded into persistent storage 116.

One or more I/O interfaces 115 may allow for input and output of data with other devices that may be connected to computing system 100. For example, I/O interface 115 can provide a connection to one or more external devices 117 such as one or more smart devices, IoT devices, recording systems such as camera systems or sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, computer monitors or screens. For example, by displaying data as part of a graphical user interface (GUI). Human-readable display 118 can also be an incorporated display and may function as a touch screen, such as a built-in display of a tablet computer.

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

System for Selecting the Best Workload Estimation for Container Orchestration Platforms It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Detailed herein are embodiments of methods, systems and computer program products describing one or more approaches that may be executed using one or more computing systems 100 operating within a container orchestration platform 200 and computing environments thereof. FIG. 2 depict an embodiment of a container orchestration platform 200 describing an approach for periodically selecting a neural network controller of the container orchestration platform 200 that best predicts a resource consumption strategy for the workloads being executed on the platform. The selected neural network controller is able to implement the strategy by scaling up or scaling down the containers or pods 227a-227n (hereinafter referred to generally as "pods 227") and/or computing resources of the compute nodes 219a-219n (hereinafter referred to generally as "compute nodes 219) to meet future workload demands on the container orchestration platform 200. The controller(s) 205 can be selected from a plurality of competing neural network(s) 207 that may have at least two different network architectures. Embodiments of the container orchestration platform 200 may include a plurality of computing systems 100, both physical and/or virtualized, represented as nodes 201, 219a-219n, that may be interconnected via a computer network. The interconnected computing systems 100 communicating over computer network can include but are not limited to management node 201, compute nodes 219 and one or more computing devices or nodes facilitating admin access 215 and/or neural network admin 217 access to the management node 201 via the API server 213.

Embodiments of management node 201, compute nodes 219 and one or more computing devices or nodes facilitating admin access 215 and/or neural network admin 217 access may not only comprise the elements or components of the nodes and devices depicted in FIG. 2 but may also incorporate one or more elements of computing system 100, as shown in FIG. 1 and described in the COMPUTING SYSTEM section above. For example, one or more elements of the computing system 100 may be integrated or provisioned to management node 201 and/or compute nodes 219, including but not limited to, the integration or provisioning of one or more processor(s) 103, memory 105, persistent storage 106, cache 107, communications unit 111, I/O interface(s) 115, external device(s) 117 and/or display 118.

Embodiments of the management node 201, compute nodes 219 and one or more computing devices or nodes facilitating admin access 215 and/or neural network admin 217 access, may be desktop computers, laptop computers, tablet computers, smartphones, server computers, or any other computer system known in the art. In some embodiments, management node 201, compute nodes 219 and one or more computing devices or nodes facilitating admin access 215 and/or neural network admin 217 access may represent computer systems utilizing clustered computers and components acting as a single pool of seamless resources when accessed through a network. For example, such embodiments may be part of storage area network (SAN), and network attached storage (NAS) applications.

Embodiments of computer networks interconnecting the nodes 201, 219 of the container orchestration platform 200 may be constructed using wired, wireless or fiber optic connections. The management node 201, compute nodes 219 and one or more computing devices or nodes facilitating admin access 215 and/or neural network admin 217 access may connect and communicate over the network using a communication unit 111, such as a network interface controller or other network communication hardware. Embodiments of the communication unit 111 may implement specialized electronic circuitry allowing for communication using a specific physical layer and a data link layer standard. For example, Ethernet, Fiber channel, Wi-Fi or Token Ring. Communication unit 111 may further allow for a full network protocol stack, enabling communication over the network to a group of computer systems or other computing hardware devices linked together through communication channels. The network may facilitate communication and resource sharing among the nodes 201, 219 of the container orchestration platform 200. Examples of networks facilitating communication between nodes 201, 219 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
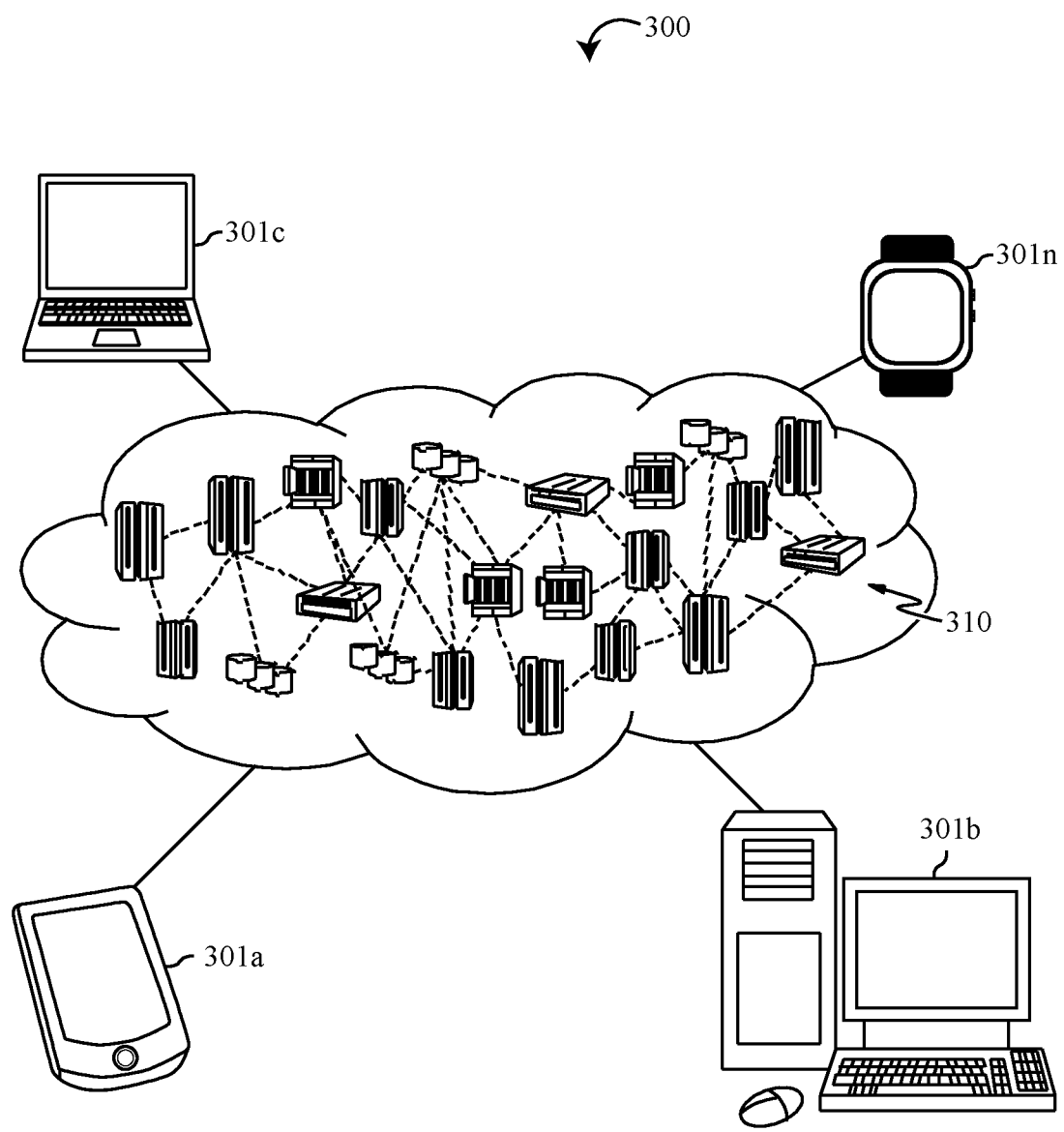
FIG. 3 depicts an embodiment of a cloud computing environment in accordance with the present disclosure.

Referring to the drawings, FIG. 3 is an illustrative example of a cloud computing environment 300. As shown, cloud computing environment 300 includes one or more cloud computing nodes 310 with which user computing devices 301a-301n may be used by cloud consumers, to access one or more software products, services, applications, and/or workloads provided by the cloud service providers. Examples of the user computing devices 301a-301n are depicted and may include devices such as a smartphone 301a or cellular telephone, desktop computer 301b, laptop computer 301c, and/or any other computing device including non-traditional computing devices such as internet-enabled smart devices, and IoT devices, such as the smartwatch 301n depicted in FIG. 3. Nodes 310 may communicate with one another and may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of user computing devices 301a-301n shown in FIG. 3 are intended to be illustrative only and that computing nodes 310 and cloud computing environment 300 can communicate with any type of computerized device over any type of network and/or network addressable connection (e.g., using a web browser).

Figure 4:
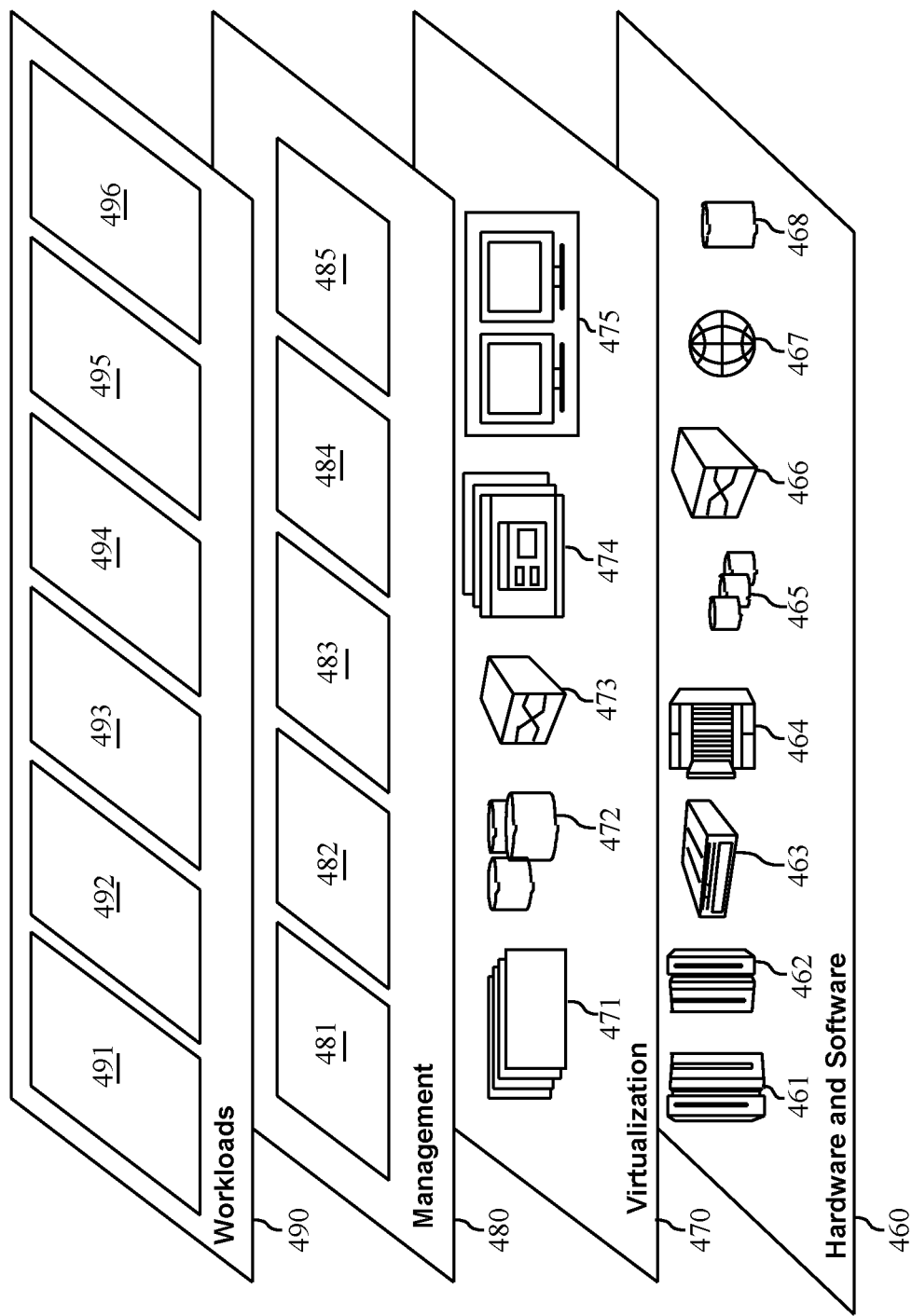
FIG. 4 depicts an embodiment of abstraction model layers of a cloud computing environment in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment 300 may be utilized. Examples of workloads and functions which may be provided from this layer include software development and lifecycle management 491, data analytics processing 492, databases 493, edge solution support 494; multi-cloud management 495 and IoT data streaming 496.

FIG. 2 depicts a computing environment comprising a container orchestration platform 200, responsible for managing the scaling (either up or down) of containers or pods 227 and/or computing resources provisioned to a plurality of compute nodes 219 responsible for providing services, applications, tools, and workloads, accessed or requested by one or more end user devices or clients. The container orchestration platform 200 automates the operation of running containerized workloads and services, including a wide range of software to manage a container's lifecycle such as the provisioning, resource scaling, networking, load balancing, and security. Examples of container orchestration platforms may include (but is not limited to) Kubernetes, OpenShift, Docker Swarm, Amazon ECS, Amazon EKS, Helios, Cloudify, Aptible, SaltStack, and Apache Mesos. As shown in the exemplary embodiment of the container orchestration platform 200, the platform may comprise a management node 201, and a plurality of computational nodes 219 capable of running containerized applications placed in communication with the management node 201.

Embodiments of management node 201 may operate or function as a control plane for managing the plurality of computational nodes 219. The management node 201 may run across multiple computing systems in order to provide fault tolerance and/or high availability. The components of management node 201 may make global decisions about the cluster 225. Components of the management node 201 can be run on any computing system (real or virtual) in a cluster 225 and/or scripts may be set up to start all components on the same computing system. In some embodiments, management node 201 may be set up so that any containers or pods 227 are not run on the same system as the management node 201. As shown in FIG. 2, components of the management node 201 may include API server 213, scheduler 203, distributed key-value store 211, training data store 209 and one or more controller(s) 205.

Embodiments of API server 213 may be a component of the management node 201 that exposes the application programming interface (API) of the container orchestration platform 200. Embodiments of the API server 213 may operate as the front end for the management node 201 and may scale horizontally by deploying additional instances of the API server 213 as well as balance network traffic between the instances of the API server 213. As shown in FIG. 2, each of the computational nodes 219 connect and communicate with the management node 201 via API server 213. Moreover, administrators of the container orchestration platform 200 and the neural networks may connect and interface with the management node 201, as shown by the blocks depicting admin access 215 and neural network admin 217.

Embodiments of computational nodes 219 may comprise a node agent 221a-221n, network proxy 223a-223n, and/or one or more pods 227a-227n. The node agents 221a-221n (hereinafter generally referred to as "node agents 221") may run on each of the compute nodes 219 and may register compute nodes 219 with the API server 213 using the hostname, a flag to override the hostname or specific logic of a cloud provider. The node agent 221 may operate using a PodSpec, which may be a YAML or JSON object that describes a pod 227. The node agent 221 may take a set of PodSpecs that may be provided through the API server 213 or other available mechanisms and ensure that the containers described in the PodSpecs are running and healthy. Other available mechanisms, that may be available for a container manifest to be provided to the node agent 221 may include passing a path as a flag on a command line, using an HTTP endpoint passed as a parameter on the command line or the node agent 221 can listen for an HTTP and respond to a simple API order to submit a new manifest.

Embodiments of the network proxy 223a-223n (hereinafter referred to generally as "network proxies 223") may run on each computational node 219 in the cluster 225. The network proxies 223 may maintain network rules on the compute nodes 219. The network rules may allow for network communications to the pods 227 from network sessions established either inside or outside of the cluster 225. In some embodiments, the network proxies 223 may use an operating system packet filtering layer, if there is one available from the operating system being used. Otherwise, the network proxy 223 can forward the network traffic itself to the pods 227.

Embodiments of pods 227 may be described as deployable units within the cluster 225 comprising one or more containers deployed together on a single host. Pods 227 may be considered equivalent to a machine instance (physical or virtual) of a container. Each pod 227 can be allocated its own internal IP address, and containers within the pods 227 can share local storage, networking resources and a specification for how to run the containers (i.e., the PodSpec). The contents of the pods 227 can be co-located, co-scheduled and run in a shared context. For example, a shared context of a pod 227 may be a set of namespaces, cgroups or other facets of isolation of the container(s). Moreover, a pod 227 can model an application-specific "logical host" and contains one or more application containers what can be relatively tightly coupled together. In a non-cloud context, applications executed on the same physical or virtual machine may be considered analogous to cloud applications executed on the same logical host. In addition to application containers, pods 227 can contain init containers that run during the startup of the pod 227. Embodiments of pods 227 can be created directly by a user or admin and/or indirectly by a controller 205. When a pod 227 is created, the new pod can be scheduled to run on a compute node 219 in a cluster 225 by the scheduler 203. The pod remains on the compute node 219 until the pod 227 finishes execution, the pod 227 is deleted for lack of resources or the compute node 219 fails.

Referring back to the management node 201, embodiments of the scheduler 203 may be a component of the management node 201 that performs tasks or functions of the management node 201 associated with monitoring the container orchestration platform 200 for newly created containers or pods 227 that have not been assigned to a computational node 219. Each pod 227 that the scheduler 203 discovers that is unassigned to a compute node 219, the scheduler 203 becomes responsible for finding the best compute node 219 for the container or pod 227 to run on. For every newly created pod or other unscheduled pods, scheduler 203 selects an optimal compute node 219 for the pod 227 to run on. However, every container within a pod 227 may have different requirements for resources and every pod 227 may also have different requirements. Therefore, existing compute nodes 219 may need to be filtered according to the specific scheduling requirements. In a cluster 225, compute nodes 219 that meet the scheduling requirements for a pod 227 may be referred to as feasible nodes. If none of the compute nodes 219 are suitable, the pod 227 may remain unscheduled until the scheduler is able to place it.

Embodiments of the scheduler 203 finds feasible compute nodes 219 for a pod 227 and may then run a set of functions to score the feasible nodes and select a compute node 219 with the highest score among the feasible ones to run the pod 227. The scheduler 203 may then notify the API server 213 about this decision in a process called binding. Factors that may be taken into account for scheduling decisions include individual and collective resource requirements, hardware, software, and policy constraints, affinity and anti-affinity specifications, data locality, inter-workload interference, etc.

Embodiments of the management node 201 may include a distributed key-value store 211. The distributed key-value store 211 may hold and manage information that distributed computing systems of the container orchestration platform 200 may need to keep running. For example, the distributed key-value store 211 may manage configuration data, state data and metadata for the container orchestration platform 200. The distributed key-value store 211 may serve as the primary key-value store for creating a functioning, fault-tolerant cluster 225 on the platform. Embodiments of the API server 213 may store each cluster's state data in the distributed key-value store 211 while the "watch" function of the distributed key-value store 211 may monitor the state data and reconfigure itself as changes occur. In some types of container orchestration platforms, such as Kubernetes, the distributed key-value store 211 may be an open source distributed key-value store referred to as "etcd".

Containerized workloads of the container orchestration platform 200 may have complex management requirements that may become more complex as the workload is scaled. The container orchestration platform 200 may simplify the process of managing the workloads by coordinating tasks such as configuration, deployment, service discovery, job scheduling and health monitoring across all clusters 225 which may be running across multiple computing systems in multiple locations. To achieve coordination, the container orchestration platform 200 may use the distributed key-value store 211 to provide a single, consistent source of truth about the status of the systems within the platform, all of the system's clusters 225, pods 227 and application instances within them. For any given point in time of the container orchestration platform 200, the distributed key-value store 211 may be the data store used to create and maintain this version of "the truth".

Embodiments of the management node 201 may include training data store 209. The training data store 209 may collect and persistently store metric data used to train one or more recurrent neural networks 207 registered with the container orchestration platform 200, as well reuse all of the existing training data stored by the training data store 209 to train newly registered recurrent neural networks at a future point in time as the neural networks 207 are added to a family of existing neural networks of the container orchestration platform 200. Collection agents 229a-229n (referred to herein generally as "collection agents 229") may be components installed onto each of the computational nodes 219 by the management node 201 (as shown in FIG. 2) and/or may be run on the management node 201 directly (not shown). Collection agents 229 may collect metric data from the compute nodes 219. The metric data collected by the collection agents 229 may describe allocated and/or utilized resources being consumed by the pods 227 within the cluster 225 of the compute nodes 219. Examples of metric data collected by the container orchestration platform may include measures of resource consumption, including but not limited to CPU usage, memory usage, storage space, etc.

Embodiments of collection agents 229 may be configured by the management node 201 to collect metric data at selected time intervals and store the metric data to the training data store 209. For example, metric data can be sent from the collection agents 229 to the training data store every 1 second (or less), every 5 seconds, every minute, every 5 minutes, and so on. The collected metric data can be stored persistently within the storage of the management node (i.e., as part of the training data store 209 or another storage component). Metric data stored within persistent storage of the training data store 209 may be continuously fed from the training data store 209 to a list of neural networks 207 registered with the container orchestration platform 200 that are being trained by the management node 201. The collected metric data being inputted into the recurrent neural networks 207 during the training period(s) can be used across all the registered neural networks wherein each of the neural networks 207 is trained by the container orchestration platform 200 using the same historical metric data to create a workload prediction strategy for scaling pods 227 and computational nodes 219 up or down in anticipation of increased or decreased workloads. Moreover, since the metric data stored by the training data store 209 persists, then the input data used to train existing registered neural networks 207 can also be re-used to train newly discovered and configured neural network types and architectures being registered with the container orchestration platform 200.

The plurality of neural networks 207 being trained by the container orchestration platform 200 may be trained in parallel to one another and may include a plurality of different types of recurrent neural network types and architectures. For instance, in an exemplary embodiment, the plurality neural networks 207 in contention for becoming a controller 205 of a cluster 225 may include at least two different neural network types and/or architectures. For example, the container orchestration platform 200 may input the metric data during continuous training periods into standard recurrent neural networks, long short-term memory (LSTM) recurrent neural networks, gated recurrent units (GRU) and/or other types or architectures of recurrent neural networks known or used by a person skilled in the art.

Embodiments of the management node 201 can evaluate the learning performance and proposed future workload strategies of the neural networks 207 being continuously trained using the metric data to determine, for each period of time between selecting a new controller 205, the neural network 207 with the best learning performance and most accurate predictions for proactively improving resource consumption of the cluster 225. The management node 201 may track and cross-examine the learning performance and prediction accuracy between each neural network 207 being trained using the metric data using mean absolute error (MAE) as a comparison between the neural networks 207. The equation for calculating MAE may be as follows:

$$\text{Mean Absolute Error} = \frac{\sum_{i=1}^{n}(y_i - \lambda(x_i))}{n}$$

Given any test dataset provided during the training sessions of the neural networks 207, the mean absolute error of the models refers to the mean of the absolute values of each prediction error on all instances of the test dataset. Wherein, the prediction error is the difference between the actual value for workload of cluster 225 of container orchestration platform 200 and the future predicted value of that instance by the neural network 207 during the training periods.

Periodically, at a configurable interval of time, neural networks 207 trained by the container orchestration platform 200 using the metric data collected from the computational nodes 219, may compete against one another to be selected as a controller 205 of the cluster 225. More specifically, the neural network controller may be tasked with implementing a workload prediction strategy for scaling the cluster 225 up or down, including increasing or decreasing the number of pods 227 in the computational nodes 219 and/or by adding and/or removing computational nodes 219 within a cluster 225. The winner of the competition between neural networks 207 may be determined based on a comparison of MAE between the trained neural networks 207. The neural network 207 with best future workload prediction strategy may be verified by the management node 201 as the neural network 207 measured to have the lowest MAE. The neural network with the lowest measured MAE may be selected as a neural network controller for the container orchestration platform 200 for the next time interval before the neural networks being continuously trained are re-evaluated against one another again. The configurable time interval between selecting a new neural network controller may be any time interval and may be configured via admin access 215. For example, the time interval between neural network 207 competitions may be less than 1 day, 1 day, 1 week, 10 days, 1 month, or longer.

Embodiments of the management node 201 may run controller processes via one or more controller(s) 205. A controller 205 may refer to a control loop that watches the shared state of the cluster 225 through the API server 213 and makes changes to the cluster 225 in order to attempt to move the current state toward a desired state. The controller(s) 205 can track at least one resource type, which can have a specification field that represents the desired state, and the controller(s) 205 for that assigned resource may be responsible for making the current state of the resource come closer to the desired state for that resource. Embodiments of the management node 201 may periodically select a neural network controller from the neural networks 207 listed by the container orchestration platform 200. As described above, the neural networks 207 compete against one another during continuous training sessions to demonstrate that a particular neural network 207 can best proactively predict the future workload needs of the container orchestration platform 200, as measured by the MAE of the neural network during the continuous periods of training using the metric data.

Once selected as the neural network controller for the next interval of time, the selected neural network 207 becomes the neural network controller responsible for scaling up or down the resources of the cluster 225. For example, by either scaling up or down the number of pods 227 within one or more compute nodes 219 or by adding and/or removing compute nodes 219. Upon selecting a new neural network controller for a particular time interval, and the new neural network controller is loaded up into the controller 205 component of the management node 201, the previous neural network controller can be taken out of service, and continue to be trained, along with the rest of the neural networks 207, using the metric data fed from the training data store 209. When the current period of time ends, a new neural network controller may be selected, including the previous neural network controller that was previously replaced by the current neural network controller.

Embodiments of the neural network controller can proactively implement the scaling of the cluster 225 in accordance with the workload prediction strategy of the selected neural network 207, via either the API server 213 or directly in some situations. In embodiments where the neural network controller scales up or down the pods 227 via the API server 213, the neural network controller may instruct the API server 213 to create or remove the pods 227. In situations where the neural network controller is adding or removing compute nodes 219, the horizontal scaling of the compute nodes 219 may be performed directly. During the addition or removal of compute nodes 219, the neural network controller may need to make changes outside of the cluster 225. In a situation where the neural network controller is using a control loop to proactively ensure there are enough compute nodes 219 within the cluster 225, the neural network controller may need to setup new compute nodes 219 or remove the compute nodes 219 from outside the current cluster 225. For example, by engaging a cluster autoscaling tool to horizontally scale compute nodes 219 within a cluster, by either adding compute nodes 219 to the cluster 225 or removing nodes 219 from the cluster 225.

Embodiments of the container orchestration platform 200 can add or remove neural networks 207 from the management node 201. The component of FIG. 2 labelled as the neural network admin 217 can register, via API server 213, new neural network types and architectures with the management node 201. The newly introduced neural networks 207 can be trained in parallel to the other previously registered neural networks using the metric data collected by the training data store 209. In some embodiments, newly registered neural networks may be prevented from being considered during the neural network controller selection period until the newly registered neural network achieve a level of mean absolute error below an established threshold level set by the container orchestration system. For example, an acceptable MAE threshold level set by an admin via the admin access 215 component. Upon achieving a level of performance considered to be acceptable for consideration to be potentially selected as a neural network controller, the newly registered neural network can be introduced to participate in being evaluated against the other neural networks of the platform during the next selection period. Likewise, as neural networks 207 fail to make accurate predictions, go offline, become error prone, are no longer in communication with the management node 201, or simply undesirable to an admin of the container orchestration platform 200, a neural network 207 can be de-registered and removed from the management node 201 via the neural network admin 217 component.

Figure 5:
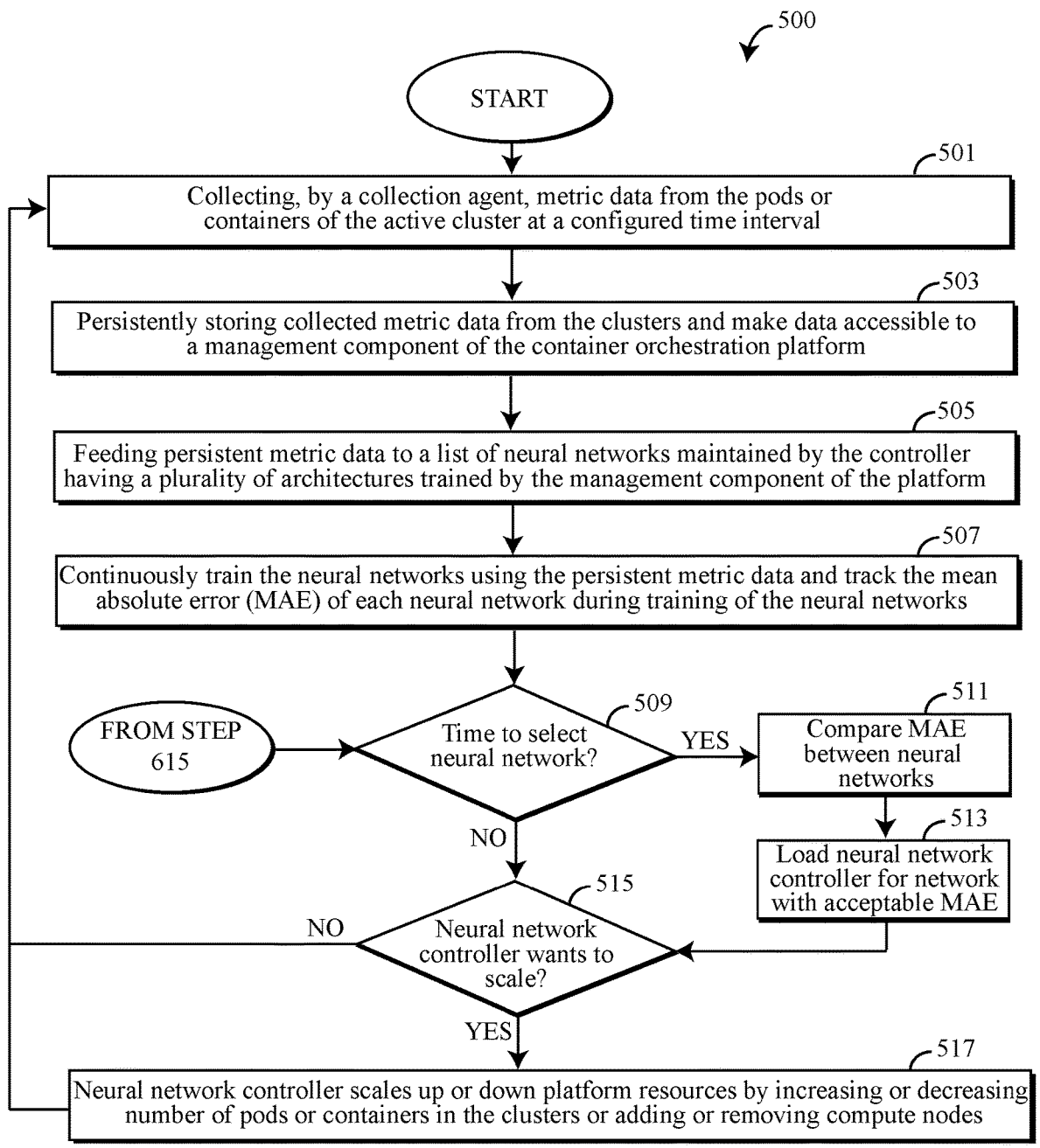
FIG. 5 depicts a flow diagram describing an embodiment of a method for periodically selecting a neural network controller of a container orchestration platform from a plurality of competing neural networks.
Figure 6:
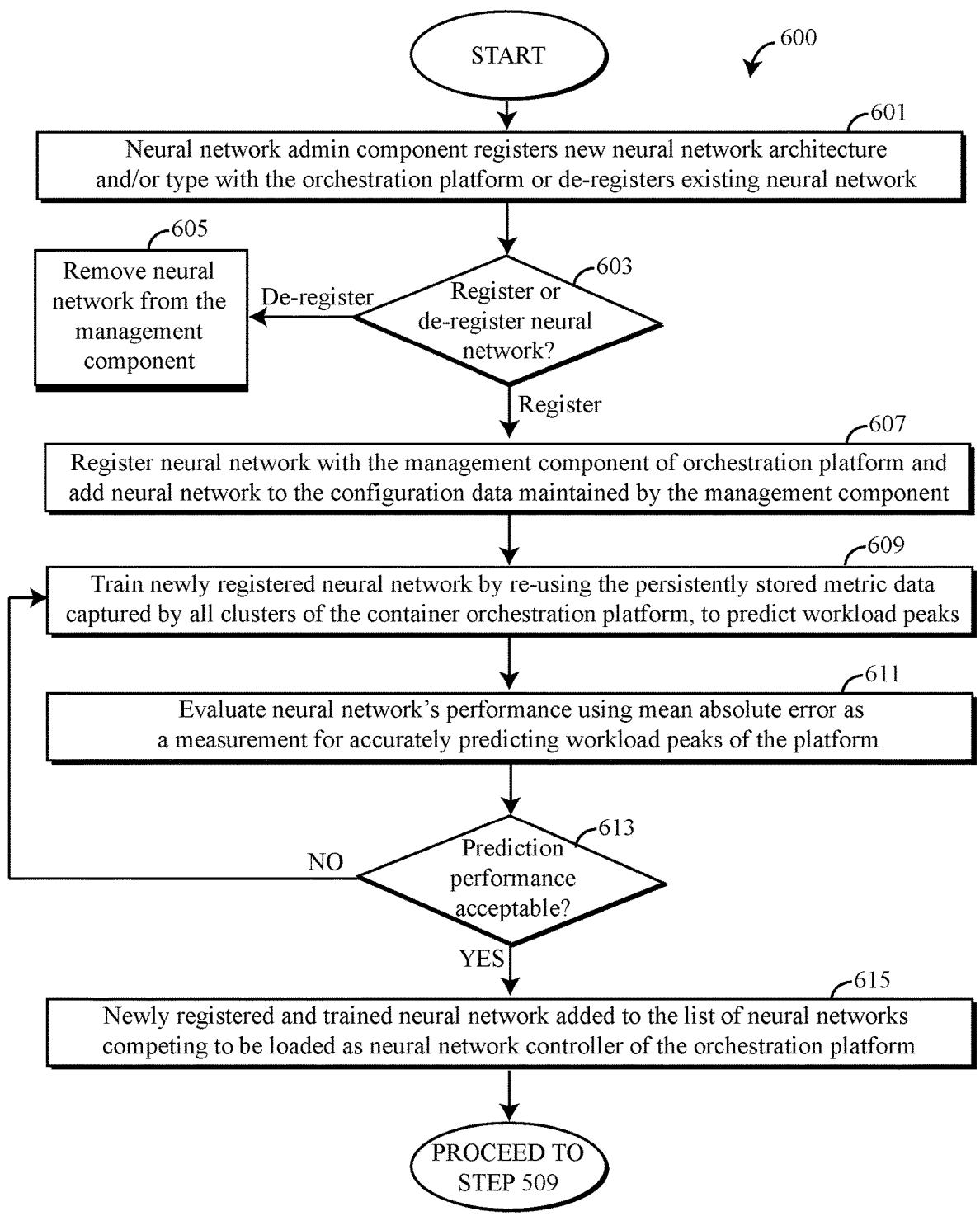
FIG. 6 depicts a flow diagram describing an embodiment of a method for registering or removing a neural network with a container orchestration platform that periodically selects a neural network controller from a plurality of competing neural networks.

Method for Periodically Selecting a Neural Network Controller of a Container Orchestration Platform The drawings of FIGS. 5-6 represent embodiments of algorithms for implementing a computerized method for periodically selecting a neural network controller of a container orchestration platform as well as a method for registering or removing neural networks from consideration as the neural network controller as described in accordance with FIGS. 2-4 above, using one or more computing systems defined generically by computing system 100 of FIG. 1, and more specifically by the embodiments described herein. A person skilled in the art should recognize that the steps of the method described in FIG. 5 and FIG. 6 may be performed in a different order than presented and may not require all the steps described herein to be performed. Rather, some embodiments may alter the methods by using one or more of the steps discussed below.

FIG. 5 presents a flowchart illustrating an algorithm 500 for periodically selecting a neural network controller of a container orchestration platform from a list of registered recurrent neural networks which may be of different types and have different architectures, in accordance with the embodiments of the present disclosure. The embodiment of the algorithm 500 may begin at step 501. At step 501, a collection agent 229 may collect metric data from each of the compute nodes 219 of an active cluster 225. Embodiments of the metric data can be collected from the pods 227 and/or containers within the pods 227 of each compute node 219. Examples of metric data that may be collected from the pods 227 and/or containers may include CPU utilization, memory utilization, storage space utilization and other key performance indicators of resource usage by the workload of the compute nodes 219 and the cluster 225. Collection of the metric data may occur continuously or at periodic intervals configured by an admin of the container orchestration platform 200, which may be configured via the admin access component 215.

At step 503, the metric data collected from the compute nodes 219 of the cluster 225 by the collection agents 229 can be transferred and persistently stored to persistent storage of the management node 201 for the cluster 225. As shown in the exemplary embodiment of FIG. 2, the metric data collected by the collection agents 229 is transferred to training data store 209 where the metric data can be persistently stored and made accessible to other components of the management node 201. Transferal of the metric data from the collection agents to the training data store 209 or other persistent storage components of the management node may occur continuously or at the configured intervals configured by the container orchestration platform administrator.

At step 505, the metric data persistently stored by the training data store 209 or other persistent storage component of the management node 201 may be fed from the training data store to a list of neural networks 207 registered with the management node 201. As shown in FIG. 2, the list of neural networks 207 and configuration information of the neural networks 207 may be maintained by one or more controller(s) 205 components of the management node 201. The list of neural networks 207 may include a plurality of neural networks 207 being trained in parallel by the management node using the metric data. The plurality of neural networks 207 can include neural networks of different types and having different architectures from one another. For example, the plurality of neural networks can include standard recurrent neural networks, LSTM neural networks (including but not limited to classic LSTM, multiplicative, and LSTMs with attention), GRU neural networks, and bidirectional recurrent neural networks (BRNN).

At step 507, the neural networks 207 registered with the management node 201 are continuously trained using the metric data being fed to the neural networks from the persistent storage of the training data store 209. The performance of each neural network 207 being trained may be tracked by the management node and quantified for the level of errors made by each neural network 207 while predicting or generating future workload predictions for the cluster(s) of the container orchestration platform 200. For example, the management node 201 may quantify the level of performance and the error of each neural network's predictions during the training period using a metric such as mean absolute error. At step 509, a determination is made by the management node 201, whether or not it is time for the management node to select a neural network 207 to operate as a controller 205 for scaling the cluster(s) 225 of the container orchestration platform. The timing for selecting amongst the competing neural networks 207 may depend on how long the interval of time between selections of the controller(s) 205 has been configured for. If, the determination is made by the management node that the interval of time configured by the admin has been satisfied, the algorithm 500 may proceed to step 511. Otherwise, if the there is still a length of time remaining before another neural network controller selection is performed, the method may proceed directly to step 515 to further determine whether or not the existing neural network control would like to scale up or down the number of pods 227 or the number of compute nodes 219 in the cluster 225.

During step 515, upon determining it's time to re-evaluate the neural networks 207 and select a new neural network controller, the management node 201 may compare the level of performance and accuracy each registered neural network 207 competing to become the neural network controller responsible for predictively scaling the clusters of the container orchestration platform 200. Based on the training data supplied by the training data store 209, a winning neural network may be identified from the list of neural networks 207, wherein the winning neural network may have the highest level of performance for accurately predicting a future workload strategy to implement by the management node 201. For example, the neural network 207 with the lowest MAE associated with the neural network's future scaling strategy may be considered to be the most accurate and/or having the highest level of performance among the list of neural networks 207.

Upon selecting the winning neural network 207, the algorithm 500 may proceed to step 513. During step 513, the management node 201 selects the winning neural network with the acceptable level or performance and future workload prediction accuracy as the new neural network controller. The winning neural network is loaded into the controller 205 component as the neural network controller of the management node 201. Moreover, if the previous neural network 207 that was loaded as the controller was not selected as the winning neural network in step 511, then the previous neural network controller can be unloaded from the controller 205 component.

In step 515 of algorithm 500, a determination may be made whether or not the neural network controller wants to scale the one or more aspects of the cluster 225. If the neural network controller of the management node 201 does not want to scale any aspects of the cluster 225, then the algorithm 500 may return to step 501. Conversely, if in step 515 the neural network controller wants to scale one or more aspects of the cluster(s) 225 of the container orchestration platform 200, the algorithm may proceed to step 517. At step 517, the neural network controller may proactively scale up or down one or more resources of the cluster(s) 225 in anticipation of future changes to the workload of the cluster(s), predicted by the neural network's future workload prediction strategy. For example, the neural network controller can communicate via API server 213 to increase or decrease the number of pods 227 and/or containers within a compute node 219. In other instances, the neural network controller may horizontally scale the size of the cluster 225, by adding or removing compute nodes 219 from the cluster 225. Upon implementation of the scaling of the cluster(s) in accordance with the neural network controller's workload prediction strategy, the algorithm 500 may proceed from step 517 back to step 501.

FIG. 6 presents a flowchart illustrating an algorithm 600 for adding or removing neural networks 207 to the management node 201 of a container orchestration platform 200, training newly registered neural networks 207 and integrating the newly registered neural network into the list of neural networks competing to become the neural network controller of the container orchestration platform 200. The algorithm 600 may begin at step 601. During step 601, a neural network admin 217 component communicates with the API server 213 to register a new neural network type and/or architecture with the management node 201 of the container orchestration platform 200 and/or de-register an existing neural network 207.

In step 603 of algorithm 600, a determination is made whether the incoming request to the API server 213 is a request to register or de-register a neural network 207. If the request is to de-register a neural network, the algorithm 600 proceeds to step 605, wherein the requested neural network 207 is removed from the list of neural networks 207 maintained by the management node 201. Conversely, if in step 603, the incoming request to the API server 213 is a request to register a new neural network 207, the algorithm may proceed to step 607. During step 607, the new neural network can be registered with the management node 201 of the container orchestration platform 200. Configuration data for the new neural network may be provided and stored by the management node.

During step 609 of algorithm 600, the newly registered neural network can be trained by the management node 201. The management node 201 may re-use the metric data persistently stored by the training data store 209 that had been previously captured and transferred from the collection agents 229 to help predict workload requirements of the cluster(s). During the continuous training of the newly registered neural network, the management node 201 at step 611 may evaluate the new neural network's level of performance to proactively predict future workloads of the cluster(s) 225. In the exemplary embodiment, such evaluation may be made by tracking the mean absolute error of the new neural network's predictions during the training period.

Periodically, a determination may be made at step 613 whether or not the new neural network's prediction performance is acceptable to be considered amongst the other neural networks 207 during the selection period for the next neural network controller. For example, whether or not future workload prediction performance is acceptable may be based on the new neural network's MAE being below a required threshold level that may be considered acceptable by an admin of the container orchestration platform 200. If the prediction performance is not yet considered acceptable, the algorithm 600 may proceed back to step 609, wherein the new neural network may continuously be trained using the latest metric data being fed from the training data store 209. Moreover, when a determination is made in step 613 that the prediction performance of the newly registered neural network is acceptable for consideration as a potential neural network controller candidate, the trained, newly registered neural network is added to a list of neural networks 207 competing to be selected as the neural network controller.

Upon being added to the list of neural networks competing to be selected as the neural network controller in step 615, the algorithm 600 may proceed to step 509 of algorithm 500, wherein the determination is made whether it's time for the management node to select a neural network as a controller for scaling the cluster(s) 225 of the container orchestration platform. If it is time to select a new neural network controller, the newly registered neural network added to the list of neural networks 207 competing to be selected, may be considered by the management node 201.

What is claimed is:

1. A computer-implemented method comprising:
training, by a management node of a container orchestration platform, a plurality of recurrent neural networks (RNNs) registered with the container orchestration platform in parallel for a plurality of time intervals using metric data collected by one or more computational nodes of the container orchestration platform, wherein the metric data is stored to persistent storage of the management node, wherein a winning RNN from the plurality of RNNs has a lowest measured mean absolute error (MAE) among the plurality of RNNs during a current time interval and provides a most accurate workload estimation strategy as measured by the MAEs of the plurality of RNNs, wherein each MAE is the mean of the absolute value of each prediction error of the metric data, and wherein the prediction error is the difference between an actual value for workload of the container orchestration platform and a future predicted value of the workload during the plurality of time intervals by each RNN of the plurality of RNNs;
loading, by the management node, the winning RNN into a controller component of the management node in the next time interval;
in accordance with the most accurate workload estimation strategy of the winning RNN in the next time interval:
dynamically creating, by the management node, one or more new computational nodes on the container orchestration platform, or
dynamically removing, by the management node, one or more preexisting nodes from the container orchestration platform; and
training, by the management node, a new RNN registered with the container orchestration platform using the metric data in the next time interval, wherein the new RNN is included in the plurality of RNNs based on a verification that a workload estimation strategy of the new RNN predicts workload of the container orchestration platform within an acceptable MAE above a set threshold.

2. The computer-implemented method of claim 1, wherein the dynamically creating further includes dynamically creating, by the management node, one or more new pods and/or one or more new containers on one or more computational nodes on the container orchestration platform.

3. The computer-implemented method of claim 1, wherein the dynamically removing further includes dynamically removing, by the management node, one or more preexisting pods and/or one or more preexisting containers from one or more computational nodes on the container orchestration platform.

4. The computer-implemented method of claim 1, wherein the plurality of RNNs registered with container orchestration platform comprises at least two RNNs having different architectures.

5. The computer-implemented method of claim 4, wherein the plurality of RNNs registered with the container orchestration platform includes a Long Short-Term Memory (LSTM) type neural network and a Gated Recurrent Unit (GRU) type neural network.

6. The computer-implemented method of claim 1, wherein the winning RNN is loaded repeatedly at a configurable time interval.

7. The computer-implemented method of claim 1, further comprising:
removing and deregistering, by the management node, a preexisting RNN from the controller component of the management node and from the plurality of RNNs prior to the loading of the winning RNN into the controller component.

8. A computer system comprising:
a management node comprising a processor;
one or more computational nodes placed in network communication with the management node;
a plurality of recurrent neural networks (RNNs) registered with the management node; and
a computer-readable storage media coupled to the processor, wherein the computer-readable storage media contains program instructions executing a computer-implemented method comprising the steps of:

training, by the management node of a container orchestration platform, the plurality of RNNs registered with the container orchestration platform in parallel for a plurality of time intervals using metric data collected by the one or more computational nodes, wherein the metric data is stored to persistent storage of the management node, wherein a winning RNN from the plurality of RNNs has a lowest measured mean absolute error (MAE) among the plurality of RNNs during a current time interval and provides a most accurate workload estimation strategy as measured by the MAEs of the plurality of RNNs, wherein each MAE is the mean of the absolute value of each prediction error of the metric data, and wherein the prediction error is the difference between an actual value for workload of the container orchestration platform and a future predicted value of the workload during the plurality of time intervals by each RNN of the plurality of RNNs;

loading, by the management node, the winning RNN into a controller component of the management node in the next time interval;

in accordance with the most accurate workload estimation strategy of the winning RNN in the next time interval:
    dynamically creating, by the management node, one or more new computational nodes on the container orchestration platform, or
    dynamically removing, by the management node, one or more preexisting nodes from the container orchestration platform; and training, by the management node, a new RNN registered with the container orchestration platform using the metric data in the next time interval, wherein the new RNN is included in the plurality of RNNs based on a verification that a workload estimation strategy of the new RNN predicts workload of the container orchestration platform within an acceptable MAE above a set threshold.

9. The computer system of claim 8, wherein the dynamically creating further includes dynamically creating, by the management node, one or more new pods and/or one or more new containers on one or more computational nodes on the container orchestration platform.

10. The computer system of claim 8, wherein the dynamically removing further includes dynamically removing, by the management node, one or more preexisting pods and/or one or more preexisting containers from one or more computational nodes on the container orchestration platform.

11. The computer system of claim 8, wherein the plurality of RNNs registered with container orchestration platform comprises at least two RNNs having different architectures.

12. The computer system of claim 11, wherein the plurality of RNNs registered with the container orchestration platform includes a Long Short-Term Memory (LSTM) type neural network and a Gated Recurrent Unit (GRU) type neural network.

13. The computer system of claim 8, wherein the winning RNN is loaded repeatedly at a configurable time interval.

14. The computer system of claim 8 further comprising:
    removing and deregistering, by the management node, a preexisting RNN from the controller component of the management node and from the plurality of RNNs prior to the loading of the winning RNN into the controller component.

15. A computer program product comprising:
    one or more computer readable storage media having computer-readable program instructions stored on the one or more computer readable storage media, said program instructions executes a computer-implemented method comprising the steps of:
    training, by a management node of a container orchestration platform, a plurality of recurrent neural networks (RNNs) registered with the container orchestration platform in parallel for a plurality of time intervals using metric data collected by one or more computational nodes of the container orchestration platform, wherein the metric data is stored to persistent storage of the management node, wherein a winning RNN; from the plurality of RNNs has a lowest measured mean absolute error (MAE) among the plurality of RNNs during a current time interval and provides a most accurate workload estimation strategy as measured by the MAEs of the plurality of RNNs, wherein each MAE is the mean of the absolute value of each prediction error of the metric data, and wherein the prediction error is the difference between an actual value for workload of the container orchestration platform and a future predicted value of the workload during the plurality of time intervals by each RNN of the plurality of RNNs;
    loading, by the management node, winning RNN into a controller component of the management node in the next time interval;
    in accordance with the most accurate workload estimation strategy of the winning RNN in the next time interval:
        dynamically creating, by the management node, one or more new computational nodes on the container orchestration platform, or
        dynamically removing, by the management node, one or more preexisting nodes from the container orchestration platform; and
    training, by the management node, a new RNN registered with the container orchestration platform using the metric data in the next time interval, wherein the new RNN is included in the plurality of RNNs based on a verification that a workload estimation strategy of the new RNN predicts workload of the container orchestration platform within an acceptable MAE above a set threshold.

16. The computer program product of claim 15, wherein the dynamically creating further includes dynamically creating, by the management node, one or more new pods and/or one or more new containers on one or more computational nodes on the container orchestration platform, and
wherein the dynamically removing further includes dynamically removing, by the management node, one or more preexisting pods and/or one or more preexisting containers from one or more computational nodes on the container orchestration platform.

17. The computer program product of claim 15, wherein the plurality of RNNs registered with container orchestration platform comprises at least two RNNs having different architectures.

18. The computer program product of claim 17, wherein the plurality of RNNs registered with the container orchestration platform includes a Long Short-Term Memory (LSTM) type neural network and a Gated Recurrent Unit (GRU) type neural network.

19. The computer program product of claim 15, wherein the winning RNN is loaded repeatedly at a configurable time interval.

20. The computer program product of claim 15, further comprising:
 removing and deregistering, by the management node, a preexisting RNN from the controller component of the management node and from the plurality of RNNs prior to the loading of the winning RNN into the controller component.

* * * * *